(12) United States Patent
Joo et al.

(10) Patent No.: US 9,561,690 B2
(45) Date of Patent: Feb. 7, 2017

(54) KERF STRUCTURE FOR SNOW TIRE

(71) Applicant: HANKOOK TIRE CO., LTD., Seoul (KR)

(72) Inventors: Sang Tak Joo, Daejeon (KR); Sung Hee Youn, Seoul (KR); Su Jin Son, Seoul (KR); Myoung Joong Lee, Seoul (KR); Sang Moo Lee, Daejeon (KR); Mu Yeong Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 214 days.

(21) Appl. No.: 14/512,874

(22) Filed: Oct. 13, 2014

(65) Prior Publication Data
US 2015/0107740 A1    Apr. 23, 2015

(30) Foreign Application Priority Data
Oct. 23, 2013 (KR) .......................... 10-2013-0126503

(51) Int. Cl.
*B60C 11/12* (2006.01)

(52) U.S. Cl.
CPC .... *B60C 11/1218* (2013.04); *B60C 2011/1213* (2013.04)

(58) Field of Classification Search
CPC .............. B60C 11/12; B60C 11/1204; B60C 2011/1213; B60C 11/1218; B60C 11/1222; B60C 11/124; B60C 11/1281

USPC .......................... 152/209.1, 209.18, 209.19, 209.21, 152/209.22
See application file for complete search history.

(56) References Cited

U.S. PATENT DOCUMENTS

| 2010/0218867 A1* | 9/2010 | Matsumoto ............. B60C 11/12 152/209.18 |
| 2015/0053320 A1* | 2/2015 | Mathonet ............ B60C 11/1218 152/209.18 |

FOREIGN PATENT DOCUMENTS

| WO | WO 2007/145603 | * 12/2007 |
| WO | WO 2011/001814 | * 1/2011 |

\* cited by examiner

*Primary Examiner* — Eric Hug
(74) *Attorney, Agent, or Firm* — Hamre, Schumann, Mueller & Larson, P.C.

(57) ABSTRACT

The present invention provides a kerf structure for a snow tire, including unit structures on each of which spiral-shaped protrusions are continuously formed to be spaced a predetermined distance apart on the outer circumferential surface of a semi-cylindrical shaped column, wherein the continuously formed unit structures are arranged by alternating convex and concave portions in a zigzag formation, which is capable of optimizing the rigidity which can maintain gripping force as an original function of a kerf while ensuring a friction force generated from small blocks of a tread portion partitioned with kerfs by collapsing a block at an optimum level and further ensuring the kerf function on snow even in the last stages of tread wear by lowering the rigidity of the blocks of the tread portion.

9 Claims, 8 Drawing Sheets

KERF STRUCTURE FOR SNOW TIRE

CROSS-REFERENCE TO RELATED APPLICATION

This application claims under 35 U.S.C. §119A the benefit of Korean Patent Application No. 10-2013-0126503 filed on Oct. 23, 2013, the entire contents of which are incorporated herein by reference.

BACKGROUND

1. Technical Field

The present invention relates to a kerf structure for a snow tire, and more particularly, to a kerf structure for a snow tire, wherein unit structures having a spiral-shaped protrusion formed on the outer circumferential surface of a semi cylindrical shaped column are continuously formed to be spaced a predetermined distance apart, thereby optimizing rigidity which can maintain gripping force as an original function of a kerf while ensuring a friction force generated from small blocks of a tread portion partitioned with kerfs by collapsing a block at an optimum level and further ensuring the kerf function on snow even in the last stages of tread wear by lowering the rigidity of the tread blocks.

2. Description of the Related Art

Typically, a plurality of grooves are formed on the tread portion of a tire in horizontal and longitudinal direction and kerfs, small grooves are formed on the block partitioned with the grooves so as to be able to adjust the rigidity of the block.

In the case of a conventional snow tire, driving and braking performances on snow-covered roads are secured by the edge effect of the kerfs during rotation on snow-covered roads. However, the kerf adapted for this edge effect reduces the rigidity of the rubber tread block and degrades the performance of a snow tire on dry roads. FIG. 1 shows the general shape of such a conventional 2D kerf for a snow tire.

Hence, although a 3D kerf has been developed to maintain the rigidity of a tread block due to the constraints of a kerf in a vertical direction on the tire surface, in actuality, it has been difficult to maintain the optimal level of rigidity. FIG. 2 is a photograph showing that in such a snow tire having a conventional kerf, small blocks of a tread portion partitioned by the kerf are collapsed when the tire is in motion. As can be seen in FIG. 2, in a conventional kerf for a snow tire, either an excessively collapsed state A of a block occurs, or a phenomenon where the leading portion of the tire is entangled occurs, thereby decreasing a friction force caused from road surface. In addition, according to a conventional kerf structure, the rigidity of the tread portion is increased in the last stage of tread wear and thus, it needs to develop the kerf structure capable of securing an optimal level of block rigidity in the last stage of tread wear.

The description provided above as a related art of the present invention is just for helping in understanding the background of the present invention and should not be construed as being included in the related art known by those skilled in the art.

SUMMARY OF THE INVENTION

The present invention has been proposed to solve the aforementioned problems associated with the prior art and an object of the present invention is to provide a 3D kerf structure for a snow tire, capable of optimizing the rigidity which can maintain gripping force as an original function of a kerf while ensuring a friction force generated from small blocks of a tread portion partitioned with kerfs by collapsing a block at an optimum level and ensuring the kerf function on snow even in the last stages of tread wear by lowering the rigidity of the blocks of the tread portion.

According to an exemplary aspect of the present invention, there is provided a kerf structure for a snow tire comprising unit structures, on each of which one or more spiral-shaped protrusions are formed on the outer circumferential surface of a semi cylindrical shaped column are continuously formed to be spaced a predetermined distance apart, wherein a straight section and an expansion section in which the unit structures are repeatedly formed in an alternating manner and a protruding direction of the semi-cylindrical shaped column in each expansion section is formed in an opposite direction to the straight section each other.

In the kerf structure for a snow tire according to the present invention, the diameter of the semi-cylindrical shaped column may gradually decrease from the top to the bottom thereof.

In the kerf structure for a snow tire according to the present invention, the thickness t1 of the kerf at the straight section may be in the range of 0.3 to 4.0 mm and the thickness t2 of the kerf at an expanded section may be in the range of 0.5 to 20 mm, which may be 1.1 to 5 times the thickness t1 of the kerf at the straight section.

In the kerf structure for a snow tire according to the present invention, the top diameter D1 of the semi-cylindrical shaped column may be in the range of 0.5 to 20 mm, the bottom diameter D2 may be in the range of 0.3 to 15 mm, the number of the spiral-shaped protrusions may be in the range of 1 to 10, and the diameter d1 of the spiral-shaped protrusion may be in the range of 0.4 to 30 mm.

BRIEF DESCRIPTION OF THE DRAWINGS

The above and other features of the present invention will now be described in detail with reference to exemplary embodiments thereof illustrated by the accompanying drawings which are given herein below by way of illustration only, and thus are not limitative of the present invention, and wherein.

Figure 1:
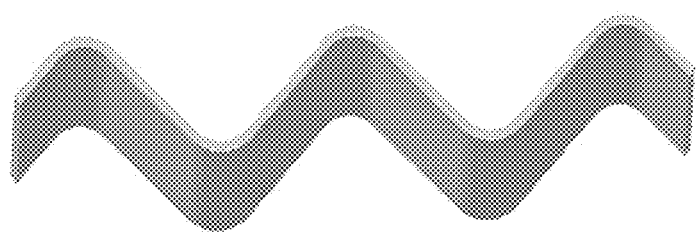
FIG. 1 shows the general shape of a conventional 2D kerf for a snow tire.
Figure 2:
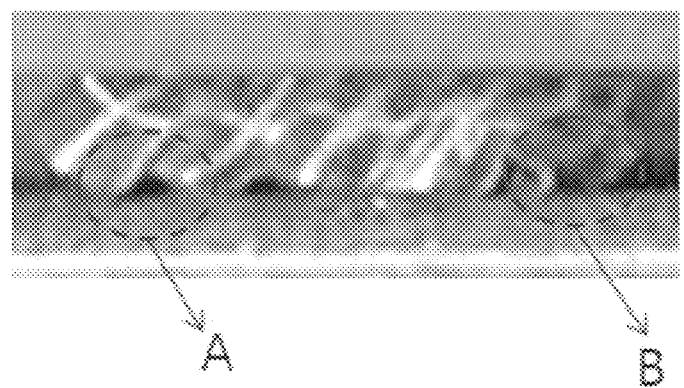
FIG. 2 is a photograph showing that in a snow tire to which a conventional kerf is adapted, small blocks of a tread portion partitioned by the kerf are collapsed when the tire is in motion.

It should be understood that the accompanying drawings are not necessarily to scale, presenting a somewhat simplified representation of various exemplary features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter, a kerf structure for a snow tire is described in more detail with reference to the accompanying drawings according to a preferred embodiment of the present invention. Further, in describing the present invention, detailed descriptions related to commonly known functions or configurations will be omitted.

The terminology used herein is for the purpose of describing particular embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

The term "straight section" in the present invention means a section in which a unit structure of a kerf is not formed.

The term "expansion section" in the present invention means a section in which spiral-shaped protrusions are formed on the outer circumferential surface of a semi-cylindrical shaped column.

The present invention relates to a kerf structure for a snow tire, which ensures the friction force generated from small blocks of a tread portion partitioned with kerfs at a snow tire by collapsing a block at an optimum level, maintains an original function of a kerf, gripping force, and lowers the rigidity of the tread blocks, thereby securing a function of the kerf on snow even in the last stages of tread wear.

Figure 3:
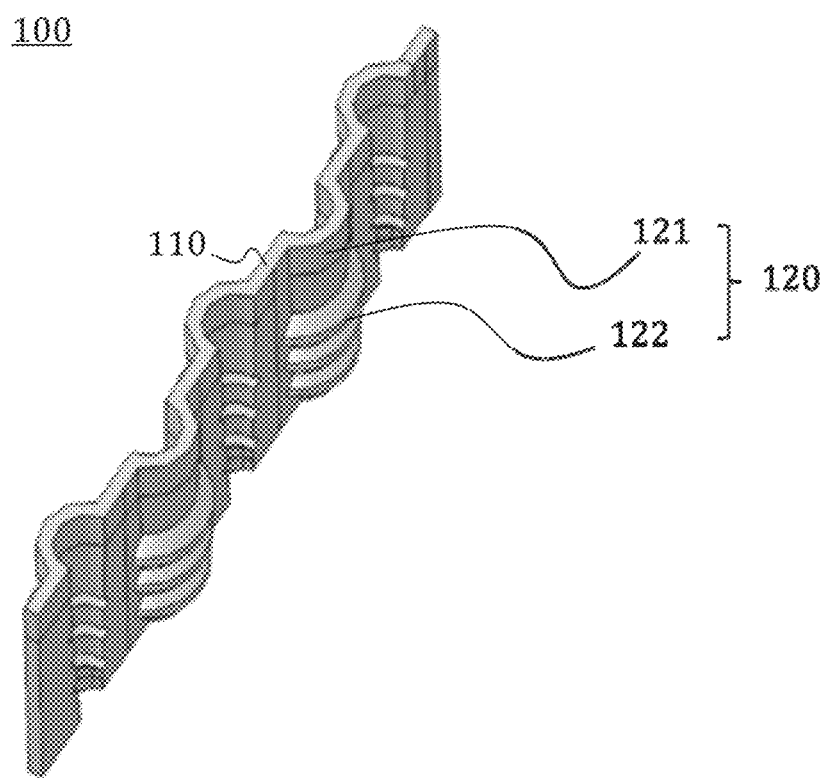
FIG. 3 is a perspective view of the kerf structure for a snow tire according an embodiment of the present invention.
Figure 4A:
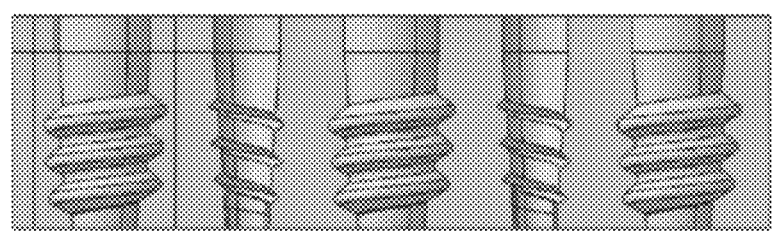
FIGS. 4A, 4B, and 4C are a front view, side view, and plan view respectively of the kerf structure shown in FIG. 3.
Figure 4B:
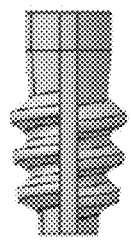
Figure 4C:
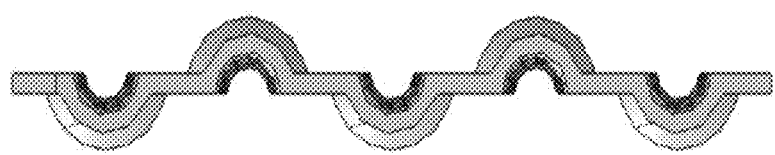
Figure 5A:
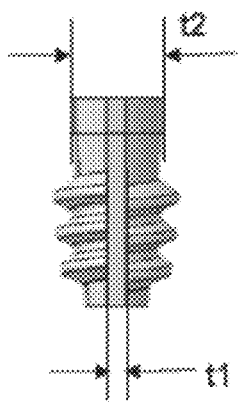
FIGS. 5A, 5B, and 5C are front views, side views, and plan views respectively, showing dimensions of parts of the kerf structure shown in FIG. 3.
Figure 5B:
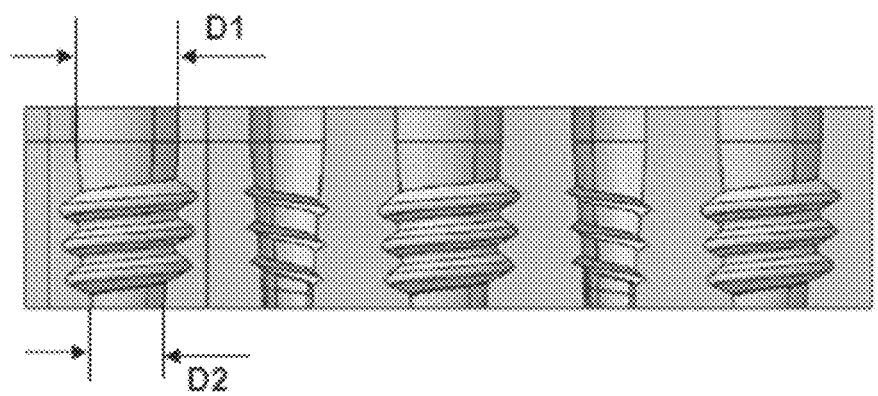
Figure 5C:
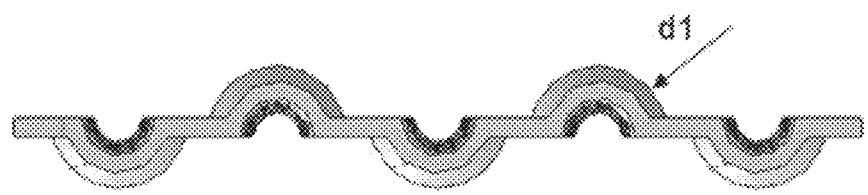
Figure 6:
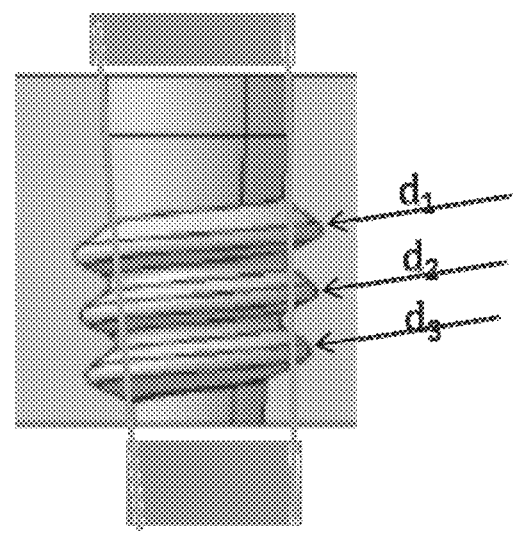
FIG. 6 is a magnified front view of the unit structure of the kerf.
Figure 7A:
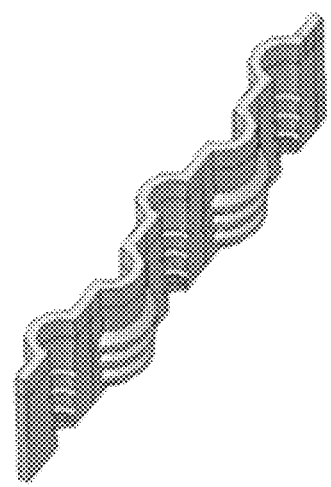
FIGS. 7A, 7B, 7C, and 7D are front-bottom-right, back-top-right, back-top-left, and front-top-left perspective views respectively, showing the kerf structure for a snow tire shown from various angles, according to an embodiment of the present invention.
Figure 7B:
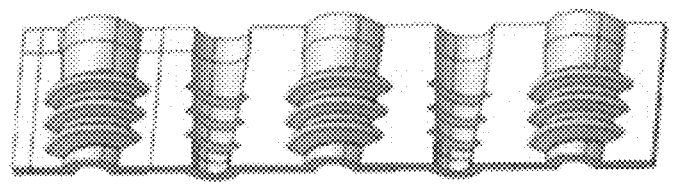
Figure 7C:
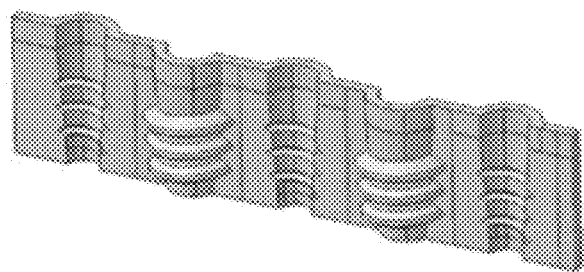
Figure 7D:
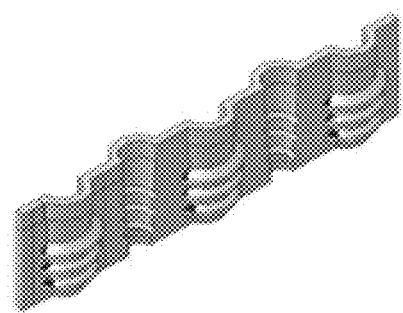

FIG. 3 is a perspective view of a kerf structure for a snow tire according to the present invention, FIGS. 4A, 4B, and 4C are a front view, side view, and plan view respectively of the kerf structure shown in FIG. 3, FIGS. 5A, 5B, and 5C are front views, side views, and plan views respectively, showing dimensions of parts of the kerf structure shown in FIG. 3, FIG. 6 is a magnified front view of the unit structure of the kerf, and FIGS. 7A, 7B, 7C, and 7D are front-bottom-right, back-top-right, back-top-left, and front-top-left perspective views respectively, showing the kerf structure for a snow tire shown from various angles, according to an embodiment of the present invention.

Referring to FIG. 3 to FIGS. 7A, 7B, 7C, and 7D, according to the kerf structure for a snow tire 100 of the present invention, unit structures, on each of which one or more spiral-shaped protrusions 122 are formed on the outer circumferential surface of a semi-cylindrical shaped column 121, are continuously formed to be spaced a predetermined distance apart, wherein a straight section 110 and an expansion section 120 are repeatedly formed in an alternating manner and a protruding direction of the semi-cylindrical shaped column 121 in each expansion section 120 is formed in an opposite direction to the straight section 110 each other.

In the kerf structure for a snow tire according to an exemplary embodiment of the present invention, the diameter D1 and D2 of the semi-cylindrical shaped column 121 gradually decreases as it becomes closer to the bottom from the surface of a tread.

According to the kerf structure for a snow tire of the present invention, the kerf may have a thickness t1 in the range of 0.3 to 4.0 mm at the straight section to prevent the collapse of a block of a tire for a passenger vehicle or truck. In addition, when considering the size of a single block of a tire for a passenger vehicle or truck, the kerf may have the thickness t2 at the expanded section in the range of 0.5-20 mm as 1.1-5 times as the thickness t1 of the kerf at the straight section.

In the kerf structure for a snow tire according to the present invention, the top diameter D1 of the semi-cylindrical shaped column 121 may be in the range of 0.5 to 20 mm, and the bottom diameter D2 may be in the range of 0.3 to 15 mm so as to secure the rigidity of the blocks at an optimum level in the early stage and the last stage of tread wear. At this time, the number of the spiral-shaped protrusion may be 1 to 10 and the diameter d1 of the spiral-shaped protrusion may be 0.4 to 30 mm considering the thickness of the kerf.

Figure 8:
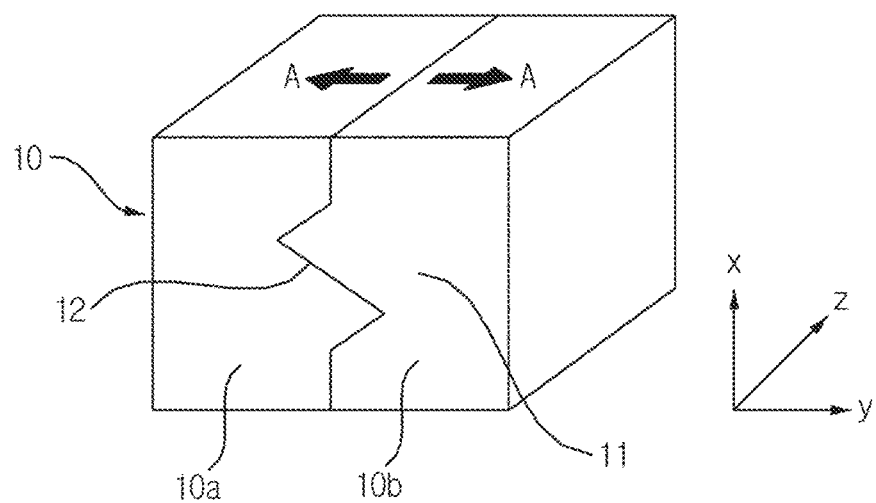
FIG. 8 is diagram showing the problem of a conventional 3D kerf shape.

According to the kerf structure for a snow tire of the present invention as described above, the uniform block rigidity may be ensured with a symmetric shape thereof regardless of the direction of the kerf. In other words, as illustrated in FIG. 8, according to the shape of the conventional 3D kerf, the block rigidity with the 3D kerf is varied depending on the direction of the tire in motion. However, according to the kerf structure of the present invention, the uniform block rigidity may be ensured regardless of the direction because the kerf structure has a symmetrical-shaped side.

Figure 9:
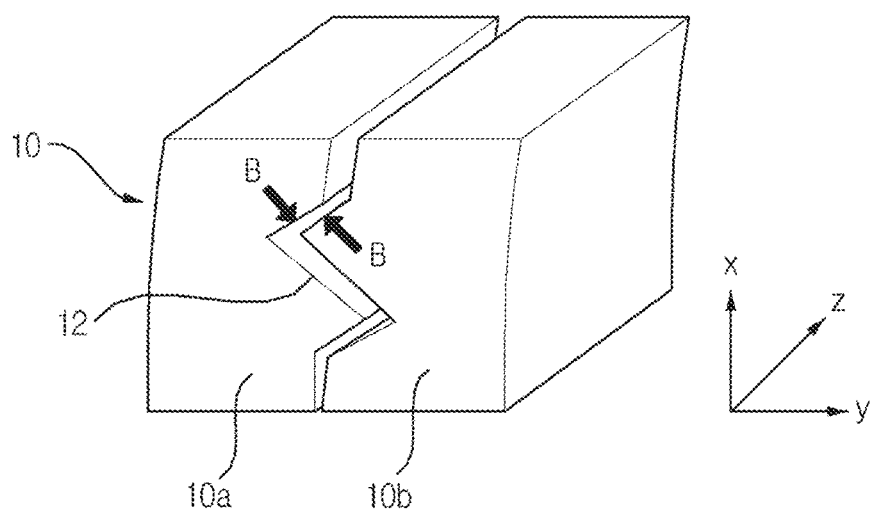
FIG. 9 is diagram showing the interlocking effect of a conventional 3D kerf shape.

Further, when a force is applied to a three dimensional kerf 12 in an arrow A direction depending on the running of a tire in FIG. 8, as illustrated in FIG. 9, the shape of the conventional 3D kerf 12 shows an insignificant effect of interlocking between sub-blocks 10a and 10b in an arrow B direction. Whereas, according to the kerf structure of the present invention, an effect of an interlocking between the blocks of the tread portion is maximized by the spiral-shaped 3D protrusions and semi-cylindrical shaped kerf structures having a gradually reduced diameter, thereby ensuring a tire performance on a dry road surface.

In particular, according to another kerf structure of the present invention, the tire performance on snow-covered roads can be ensured since the spiral-shaped kerf is greatly waved in the last stages of tread wear, as compared with the semi-cylindrical shaped kerf in the initial stage of tread wear to suppress the increased rigidity of blocks even in the last stages of tread wear. This effect is distinct considering the usual tendency of a tire to have block rigidity exceeding an appropriate level to secure a grip on a snow-covered surface due to the increased block rigidity in the last stages of tread wear. In addition, as illustrated in FIG. 6, the diameter of the semi-cylindrical shaped column decreases gradually as tread wear progresses to independently obtain a binding force in the vertical direction.

According to the kerf structure for a snow tire of the present invention described above, the uniform block rigidity may be ensured with a symmetric shape thereof regardless of the direction of the kerf. In particular, the interlocking effect between the blocks of the tread portion can be maximized by the spiral-shaped 3D protrusions and semi-cylindrical shaped kerf structures having a gradually reduced diameter, thereby ensuring a tire performance on a dry road surface.

In particular, according to another kerf structure of the present invention, the tire performance on snow-covered roads can be ensured since the spiral-shaped kerf is greatly waved in the last stages of tread wear, as compared with the semi-cylindrical shaped kerf in the initial stage of tread wear.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A kerf structure for a snow tire, comprising:
a straight section being deformed to have spaced apart semi-cylindrical shaped columns alternatingly protruding in opposite directions out of a plane of the straight section, axes of the semi-cylindrical shaped columns being coplanar with the plane of the straight section and oriented in a radial direction, wherein the semi-cylindrical shaped columns include at least one spiral-shaped protrusion.

2. The kerf structure for a snow tire of claim 1, wherein a diameter of the semi-cylindrical shaped columns gradually decreases as it becomes closer to a bottom from a surface of a tread.

3. The kerf structure for a snow tire of claim 1, wherein a thickness of the kerf at the straight section is in a range of 0.3 to 4.0 mm.

4. The kerf structure for a snow tire of claim 1, wherein a thickness of the semi-cylindrical shaped columns is in a range of 0.5 to 20 mm and in a range of 1.1 to 5 times a thickness of the straight section.

5. The kerf structure for a snow tire of claim 1, wherein a top diameter of the semi-cylindrical shaped columns is in a range of 0.5 to 20 mm, and a bottom diameter is in a range of 0.3 to 15 mm.

6. The kerf structure for a snow tire of claim 1, wherein a number of the at least one spiral-shaped protrusion is in a range of 1 to 10.

7. The kerf structure for a snow tire of claim 1, wherein a diameter of the at least one spiral-shaped protrusion is in a range of 0.4 to 30 mm.

8. The kerf structure for a snow tire of claim 1, wherein the straight section has a constant thickness.

9. The kerf structure for a snow tire of claim 1, wherein the at least one spiral-shaped protrusion includes a plurality of protrusions spaced apart along a length of the semi-cylindrical shaped column.

* * * * *